United States Patent [19]

diVincenzo

[11] Patent Number: 4,651,780

[45] Date of Patent: Mar. 24, 1987

[54] APPARATUS FOR VISUALLY MONITORING AND CONTROLLING THE LIQUID FLOW IN A PRESSURE LINE

[76] Inventor: Guido A. diVincenzo, Rte. 6, Box 240, Asheboro, N.C. 27203

[21] Appl. No.: 719,215

[22] Filed: Apr. 2, 1985

[51] Int. Cl.[4] .......................... F16K 37/00; F17D 1/00
[52] U.S. Cl. .................................. 137/559; 137/572; 137/573; 137/592
[58] Field of Search .................. 34/50; 236/44 A; 137/559, 573, 574, 592

[56] References Cited

U.S. PATENT DOCUMENTS

| | | | |
|---|---|---|---|
| 2,302,528 | 11/1942 | Conklin | 236/44 A |
| 2,866,457 | 12/1956 | Moore | 137/559 |
| 2,970,938 | 2/1961 | Erbach | 137/573 |
| 3,021,841 | 2/1962 | Burke | 137/559 |
| 3,216,419 | 11/1965 | Scislowicz | 137/559 |
| 3,929,157 | 12/1975 | Serur | 137/453 |
| 3,965,895 | 6/1976 | Dabney | 137/592 |

Primary Examiner—A. Michael Chambers
Attorney, Agent, or Firm—Charles R. Rhodes; Judith E. Garmon

[57] ABSTRACT

A pressurized liquid conduit is broken or interrupted to provide an upstream inlet into a downstream outlet from a visual monitoring device. The device, which includes a collection chamber surrounding the conduit outlet and a transparent tube extending upwardly therefrom surrounding the upstream inlet is sealed in air tight relation around the liquid line on either side of the interruption. An air lock or bubble, greater in volume than the volume of the transparent tube, is contained in the chamber/tube assembly to maintain a constant pressure on the liquid collected in the chamber causing a controlled flow of liquid through the downstream side of the line. A baffle in the collection chamber disperses air bubbles, which might tend to form in the collected liquid, prior to the time the air bubbles reach the outlet in the chamber.

3 Claims, 2 Drawing Figures

APPARATUS FOR VISUALLY MONITORING AND CONTROLLING THE LIQUID FLOW IN A PRESSURE LINE

BACKGROUND AND SUMMARY OF THE PRESENT INVENTION

This invention relates to the monitoring of a liquid such as water through a pressurized opaque line. In certain types of industrial or commercial environments, it is often necessary to maintain a reservoir or tank of water or other liquid full or at a desired level at all times in order to provide for humidity control or similar situations. Generally, in such situations, the water or liquid in the tank is constantly being used, and therefore a constant flow of liquid into the tank must be provided. For example, in a lumber kiln, there is provided a "wet bulb box" within the kiln which receives a supply of water from a pressure line, which water is picked up by a wick and evaporated into the atmosphere of the room by the flow of air thereover. The water is constantly being used, and therefore must constantly be supplied to maintain the wet bulb box at a fluid level that slightly overflows at all times (so operator can determine if sufficient water is present).

In certain installations, this is a relatively easy task. For example, imagine a water trough in which the water is constantly being drained out an opening in the lower area thereof. It is a relatively simple matter to adjust the valve of a faucet which delivers water into the trough to supply water at the same rate at which it is being withdrawn. On the other hand, imagine a watering trough in which the operator cannot visually see the output from the faucet into the trough, as is the case in a reservoir of the type in which the supply line to the reservoir actually introduces the water below the water level. To further complicate the situation, in a kiln or similar atmosphere, it may be dangerous for an operator to enter the kiln, if the temperature and moisture conditions are too high, to inspect the wet bulb box. Float valves have proven generally unsatisfactory because of their tendency to become clogged.

It therefore becomes highly desirable to be able to easily monitor and control the flow of water or liquid through the opaque pressurized feed line at a point outside of the kiln or other operating environment. This cannot be accomplished merely by making a portion of the feed line transparent, because in a pressurized line situation, the water always fills the feed line, and a visual inspection will not allow the operator to determine the rate of water flow.

It is this type of situation and problem which the present invention attempts to overcome. Short of elaborate controls, there is no known apparatus available for visually monitoring and controlling the flow of liquid through a pressurized line other than at the outlet thereof.

In general, the approach adopted in the present invention is to provide an interruption or intermediate outlet in a vertical section of an opaque pressurized liquid line allowing the liquid to fall at a prescribed rate through a transparent tube into a collection chamber. The collection chamber and transparent tube are sealed to the upstream and downstream portions of the conduit, as well as to each other. The sealing creates an "air lock, " which as used herein describes the condition which exists as the air pressure within the collection chamber and transparent tube increases as the inlet valve is opened and liquid begins to fill the collection chamber. Eventually the air pressure will overcome the back pressure created by the liquid in the downstream portion of the conduit and cause the liquid to flow out of the collection chamber at the same rate that it is being introduced through the inlet valve. Once an equilibrium situation is established, the level within the collection chamber remains the same unless back pressure in the downstream line or leakage of the air from the chamber occurs. Thus the air lock serves the dual purpose of keeping the transparent tube evacuated which would otherwise obstruct the visual monitoring of the fluid liquid flow, and of maintaining sufficient pressure in the line to move the liquid out of the collection chamber at the same rate at which it is entering. The fluid flow may vary from a lazy stream to individual droplets being emitted through the observation tube and into the collection chamber, however, because the transparent observation tube is kept free of liquid and is large enough that the liquid being emitted from the outlet of the upstream portion does not engage the sides thereof, a clear monitoring of the stream size therethrough is possible.

The apparatus according to the present invention then permits visual inspection and adjustment of the flow rate of the liquid, while maintaining pressurized system which ensures continuous flow at the prescribed rate to the desired destination. Toward this end, an interruption or intermediate enclosed outlet in the pressure line provides for the free fall of the liquid for a prescribed distance through which the liquid is surrounded only by the transparent tube and is thus visible. A control valve is interposed in the pressure line upstream (or even downstream) of the intermediate outlet to vary the flow of liquid therethrough as is necessary to maintain the proper level in the reservoir. A visual monitoring means downstream of the valve surrounds the intermediate outlet in sealing arrangement thereto and includes a collection chamber attached to the upstream end of the downstream portion of the conduit, which chamber has a volume considerably greater than the instantaneous volume of fluid collected therein at any one time. The collection chamber has an opening in the upper end thereof for receiving the incoming liquid stream therethrough. A length of transparent tubing connects the opening in the upper wall of the collection chamber with the downstream end of the upstream portion of the conduit. The transparent tube is of an inner diameter substantially greater than the inner diameter of the conduit and considerably smaller than the inner diameter of the collection chamber, however, the inner diameter of the transparent tube is large enough that the stream or droplets being emitted from the orifice of the upstream conduit do not engage the side walls as they expand at the outlet (in the case of droplets) or otherwise engage the side wall of the transparent tube in the case of a tube that is slightly askew from the vertical. Also, the diameter of the transparent tube should not be too large, because the collection chamber would have to be enlarged. The housing and transparent tubing are connected to the conduit around the interruption in substantially air tight arrangement. An air lock is provided in the chamber and transparent tubing, the volume of which is greater than the volume of the tubing. As a result of the air lock the fluid leaves the chamber at the same rate that it enters and the normal fluid level tends to remain within the collection chamber rather than rising up within the observation tube.

It is therefore an object of the present invention to visually monitor the flow of liquid through a pressurized line at a point upstream of the outlet thereof without interrupting the rate of flow therethrough.

It is another object of the present invention to provide a means for maintaining a constant level of liquid in a reservoir from which the liquid is constantly being removed, which liquid is being delivered to the reservoir through a pressurized opaque line, from a point remote from the reservoir.

Other objects and a fuller understanding of the invention will become apparent from reading the following detailed description of a preferred embodiment along with the accompanying drawings in which.

DETAILED DESCRIPTION OF A PREFERRED EMBODIMENT

Figure 1:
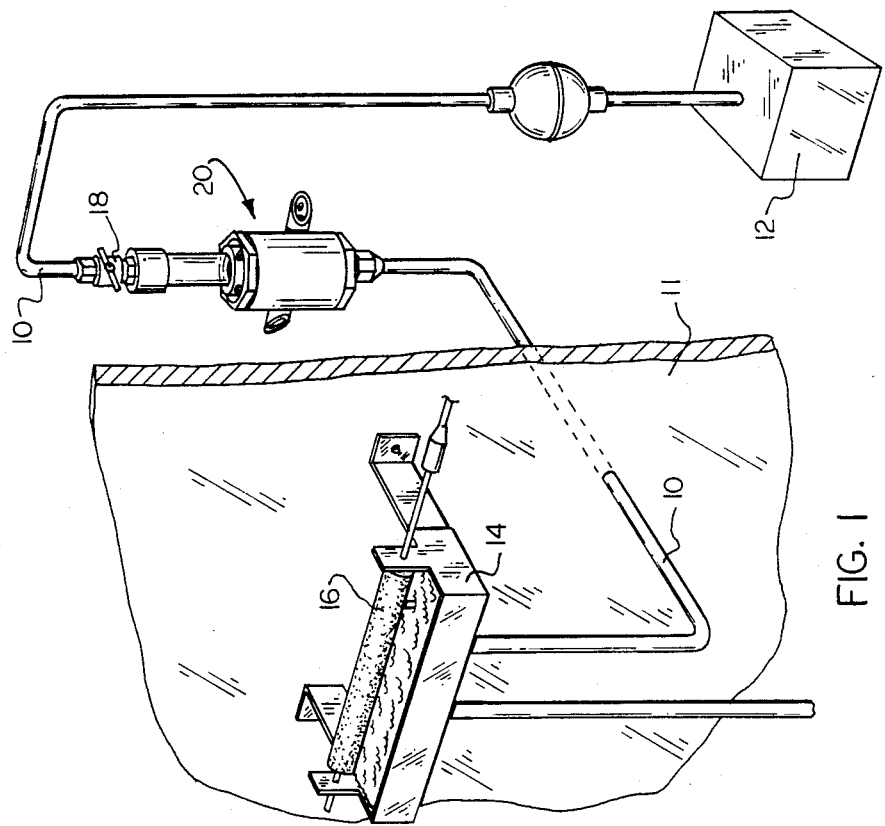
FIG. 1 is a mechanical schematic diagram of a typical installation in which the apparatus of the present invention is utilized.

Turning now to the drawings there is illustrated in FIG. 1 the environment in which the liquid monitoring device of the present invention is installed. An opaque liquid line 10 extends from a source or supply 12 to a reservoir 14 through which liquid is delivered under pressure. Reservoir 14 is positioned within a work area requiring a constant controlled supply of water or liquid for the purpose of controlling humidity, such as a drying kiln, the wall of which is represented at 11. The reservoir 14 includes a wet bulb sensor 16 to measure "wet bulb" temperature. This is conventionally referred to as a "wet bulb box." The liquid line 10 delivers liquid into the bottom of reservoir 14. It is desired that this reservoir 14 from which water or other liquid is continuously being withdrawn be maintained full or slightly overflowing. As stated hereinabove, it is generally not always feasible for an operator to enter the kiln during the operating times.

In order to monitor and control the delivery of liquid to box 14, the opaque pressure line 10 is interrupted upstream the outlet thereof and outside the wall 11 of the kiln. A visual monitoring means 20 of the present invention is emplaced at the point of interruption. Immediately above the visual monitoring means 20 there is provided a control valve, preferably in the form of needle valve 18, which can be adjusted to introduce a prescribed flow of liquid into the visual monitoring means 20.

Figure 2:
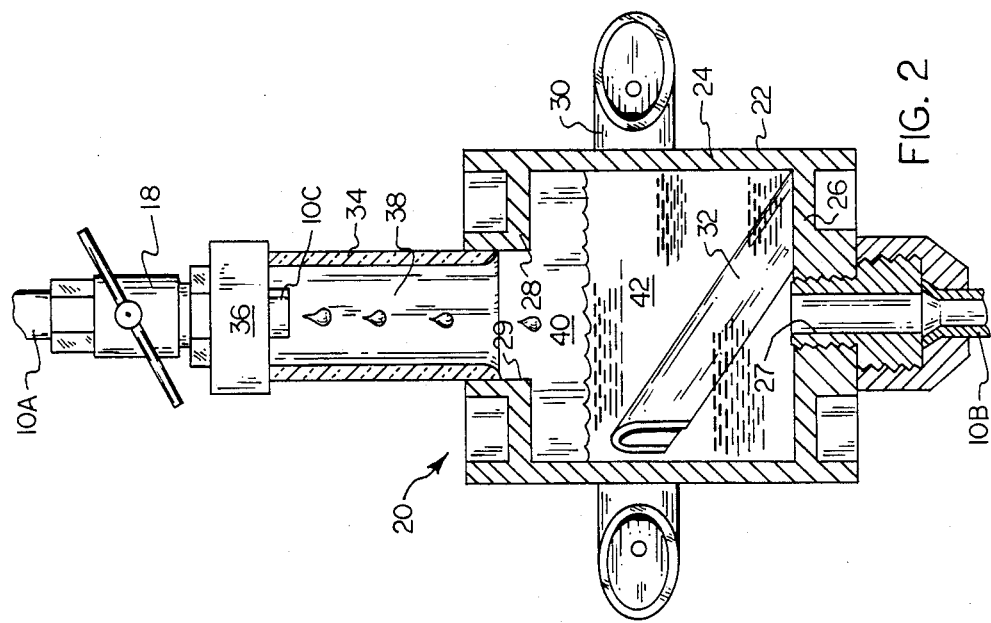
FIG. 2 is a longitudinal sectional view of the visual monitoring means of the present invention.

FIG. 2 is an enlarged illustration, in section, of the visual monitoring means 20 which is emplaced between the downstream end of the upstream portion 10a of the pressure line 10 and the upstream end of the downstream portion 10b of conduit 10. Reference numeral 10c represents the actual outlet or orifice of the downstream end of upstream portion 10a. A collection chamber 22 is emplaced in operative, but sealed arrangement around the upstream end of downstream portion 10b. Housing 22 includes a preferably cylindrical side wall 24, a bottom wall 26, and a top wall 28. A passageway 27 extends through the bottom wall 26 into communication with the downstream conduit portion 10b so that liquid being collected within chamber 22 is forced out into conduit 10b through the passageway 27.

There is further provided an opening 29 in the upper wall 28 which receives therein the lower end of a transparent observation tube 34. A plastic collar 36 serves to connect the upper end of the observation tube 34 with the downstream end of the upstream portion 10a of conduit 10 immediately below valve 18. The collar 36 serves to attach the observation tube 34 in sealing or air tight relation to the conduit 10a even if and when the air pressure within the observation tube 34 exceeds atmospheric pressure. Likewise, the lower wall 26 of housing 22 is sealed in air tight relation to the downstream conduit portion 10b even under such conditions that the air pressure within housing 22 exceeds atmospheric pressure.

Observation tube 34 is hollow and the previously described air lock is formed by the hollow interior 38 of tube 34 and the area 40 within chamber 22 above the level of the liquid 42 collected therein. The aforesaid air lock maintains a greater than atmospheric air pressure within the housing 22 which tends to force liquid out passageway 27 at the same rate at which it is being introduced into housing 22 from the outlet 10c of the upper conduit portion 10a. As the valve 18 is adjusted to permit a greater or lesser flow of liquid, the air lock 38,40 will tend to force more or less liquid through passageway 27 at the corresponding rate. It should be noted here that the observation tube 34 must be of a sufficient inner diameter, that, neither water droplets or the stream of water emitted from orifice 10c substantially engage or impinge upon the walls of tube 34. When droplets form at the outlet 10c of upper conduit portion 10a during such times that drops are being delivered, should the droplets enlarge and impinge upon the wall of tube 34, this would tend to obscure the visibility of the stream or droplets being emitted therethrough.

As a stream of water or liquid falls into the body of water 42, there tends to form air bubbles as a result of cavitation within the body of liquid, depending upon the force with which the stream is being delivered. Such air bubbles might ordinarily tend to work their way out passageway 27, however, a baffle 32 is provided on the lower wall 26 of housing 22 which tends to disburse the air bubbles. Baffle 32 slants upwardly from lower wall 26 to a point overlying passageway 27.

A pair of ears or protrusions 30 extend outwardly from either side of housing 22 to provide an attachment means for the housing 22 to a wall or equipment casing.

In use, valve 18 is adjusted to maintain the reservoir or wet bulb box 14 at a prescribed level. The velocity or rate of flow of fluid being emitted from the outlet 10c can then be noted. If the liquid level begins to drop, as indicated by the wet bulb temperature or as by noted visually valve 18 may be opened slightly and the rate of flow then noted by visually inspecting tube 34. Conversely, if the reservoir 14 overflows too much, the valve 18 may be closed slightly. Should the level of liquid 42 in the reservoir 22 rise to the point that it is visible in tube 34, this is a sign that there is a blockage in the downstream conduit portion 10b or that there is an air leak. To prevent such blockages, periodically (such as daily) the valve 18 should be opened for a few seconds to allow a strong flow of liquid therethrough, which will tend to flush the downstream portions of the line. Immediately upon flushing, the valve can be returned to a position where the desired rate of flow, as noted through the observation tube 34 is maintained. In the case of an air leak, the housing 22 can be removed and replaced or repaired. Thus, in normal usage, the level of the body of liquid 42 should remain the same.

While a preferred embodiment of the present invention has been described in detail hereinbelow, it is apparent that various changes and modifications might be made without departing from the scope of the invention which is set forth in the accompanying claims.

What is claimed is:

1. Apparatus for visually monitoring and controlling the volume of flow of a liquid in a pressurized opaque conduit to maintain a desired rate of flow of the fluid from a source to a visibly inaccessible reservoir regardless of the elevation of the reservoir with respect to the conduit, said apparatus comprising:

(a) a vertical section in said pressurized conduit upstream of said reservoir, said vertical section including an interruption therein dividing the conduit into an upstream portion and a downstream portion and including an orifice, a portion of said conduit including a transparent tubing surrounding said orifice and of a sufficient diameter to allow unencumbered fall of said liquid for a prescribed distance through which said liquid is visible;

(b) a control valve operatively associated with said conduit upstream of said orifice for controlling the flow rate of liquid therefrom;

(c) a visual monitoring means downstream of said valve and defining said interruption, said visual monitoring means including:

(i) a collection chamber attached to the upstream end of the downstream portion of said conduit, and having an outlet passageway in the lower wall thereof communicating with said downstream portion, said chamber having a volume considerably greater than the instantaneous volume of liquid collected in said chamber, said collection chamber further having an inlet opening in the upper end thereof;

(ii) said transparent tubing surrounding said orifice connecting said inlet opening in the upper end of said collection chamber with the downstream end of the upstream portion of said conduit, said transparent tubing being of an inner diameter substantially greater than the inner diameter of the downstream end of the upstream portion of said conduit and considerably smaller than the inner diameter of said collection chamber;

(iii) means for connecting said collection chamber and transparent tubing to said conduit portions in sealing substantially air tight arrangement regardless of the internal pressure; and (iv) the sealing of said chamber and tubing forming an air lock therein when said valve is opened, the volume of said air lock being greater than the volume of said tubing, whereby compressed air formed by the collection of liquid in the chamber causes the liquid to leave said collection chamber at the same rate that it enters and the normal liquid level tends to remain constant within said collection chamber.

2. The apparatus according to claim 1 wherein the inner diameter of said tubing is of such dimension that liquid emitted from the outlet of the upstream conduit do not engage the side walls of said tubing.

3. The apparatus according to claim 1 and further including a baffle in said collection chamber overlying the outlet opening therein, whereby air bubbles which may inadvertently become entrained in the liquid collected in said collection chamber are dissipated prior to being discharged from the outlet of said collection chamber.

* * * * *